United States Patent

[11] 3,557,825

| [72] | Inventor | Carl Bischoff<br>1, Augusta-Anlage 52, 68 Mannheim, Germany |
|---|---|---|
| [21] | Appl. No. | 844,421 |
| [22] | Filed | July 24, 1969 |
| [45] | Patented | Jan. 26, 1971 |
| [32] | Priority | July 27, 1968 |
| [33] | | Germany |
| [31] | | B766,22 |

[54] PILOT-CONTROLLED RELIEF VALVE
10 Claims, 5 Drawing Figs.

[52] U.S. Cl. .................................... 137/489,
137/491
[51] Int. Cl. .................................... F16k 31/163,
F16k 31/143
[50] Field of Search ......................... 137/489,
491, 489.3, 492, 488, 492.5

[56] References Cited
UNITED STATES PATENTS

| 231,214 | 8/1880 | Curtis | 137/489 |
|---|---|---|---|
| 937,774 | 10/1909 | Cunning | 137/489 |
| 1,098,616 | 6/1914 | Creveling | 137/492X |
| 1,457,049 | 5/1923 | Webb | 137/489X |
| 2,498,542 | 2/1950 | Gardiner | 137/491 |
| 3,177,889 | 4/1965 | Hardison | 137/491X |

Primary Examiner—Laverne D. Geiger
Assistant Examiner—Robert J. Miller
Attorney—Michael S. Striker ABSTRACT: A pilot-controlled relief valve wherein the fluid filling the inlet of the body of the main valve is maintained at main system pressure and is normally sealed from an outlet by a cylindrical valve member which is slidable along a fixed piston and defines with the body a pressure chamber in communication with the inlet. The fluid which fills the pressure chamber tends to maintain the valve member in sealing engagement with a ring-shaped seat of the body. The valve member defines with the piston a compartment which can be connected with the inlet by a pilot valve when the latter responds to a predetermined maximum fluid pressure in the pressure chamber whereby the fluid in the compartment moves the valve member away from sealing position. The movements of the valve member toward and away from sealing position are braked by fluid which enters a damping chamber between the valve member and the piston when the valve member is moved away from seat. The damping chamber communicates with the outlet by way of a space provided in the body and separated from the outlet by an apertured baffle.

Inventor:
CARL BISCHOFF

3,557,825

PILOT-CONTROLLED RELIEF VALVE

BACKGROUND OF THE INVENTION

The present invention relates to pilot-controlled relief valves in general, and more particularly to improvements in pilot-controlled relief valves which are especially suited to prevent excessive buildup of pressure in conduits or containers for steam of other gaseous fluids.

It is already known to provide the main valve of a relief valve with a valve member which is biased against the seat by fluid under main system pressure and is opened in response to opening of a pilot valve which admits pressurized fluid against a surface of the valve member so that the latter begins to move toward open position. At the same time, the pilot valve reduces the pressure of fluid which tends to maintain the valve member in sealing position. It is also known to provide such relief valves with an auxiliary piston which is displaced in response to opening of the pilot valve (when the main system pressure rises to a preselected value) whereby the piston effects opening of the valve member.

A drawback of such conventional relief valves is that the force which acts upon the valve member during opening increases so that the valve member is propelled toward open position and generates excessive noise. The same applies when the valve member begins to move toward sealing position. Such acceleration of the valve member is due to increasing reaction of fluid which escapes through the valve seat during opening of the main valve and to decreasing reaction of escaping fluid when the valve member moves toward sealing position. The impacts of the valve member against its seat or against a stop which limits its movement away from the seat cause undesireable shocks which can result in damage to the relief valve. Attempts to reduce such shocks and attendant noise include the provision of special braking cylinders, strong springs or specially designed pilot valves which interrupt or reduce the outflow of pressurize fluid during opening of the valve member. All such devices contribute to the initial and maintenance cost as well as to the bulk and weight of the relief valve.

SUMMARY OF THE INVENTION

An object of the present invention is to provide a pilot-controlled relief valve for steam or the like wherein the movements of the valve member in the main valve are braked in a novel and improved way.

Another object of the invention is to provide a relief valve wherein the valve member of the main valve is braked not only during movement toward open position but also during return movement toward sealing position.

A further object of the invention is to provide a compact relief valve wherein the means for damping movements of the valve member to sealing and/or open position occupies little room and comprises a small number of relatively simple and inexpensive parts.

An additional object of the invention is to provide a relief valve which can be mounted in any desired position of inclination and which is automatically closed when the main system pressure drops below a preselected value or when the valve is detached from the fluid conveying or accommodating system.

Still another object of the invention is to provide a novel main valve which can be used in a pilot-controlled relief valve of the above outlined character.

The invention is embodied in a pilot-controlled relief valve which is particularly suited for use in connection with steam or other gaseous fluids. The relief valve comprises a main valve having a body provided with an inlet for fluid under main system pressure, and outlet and a seat located between the inlet and the outlet, a cylindrical valve member defining with the body a pressure chamber which is in communication with the inlet and wherein the fluid tends to maintain the valve member in a sealing position of engagement with the seat to thereby seal the inlet from the outlet, and a fixed piston slidably guiding the valve member for movement between the sealing position and an open position. The valve member defines with the piston a damping chamber which is in communication with the outlet (preferably by way of a space provided in the body and communicating with the outlet via openings machined into a fixed baffle) and a compartment which is sealed from the pressure chamber and preferably communicates with the damping chamber by way of one or more narrow passages or adjustable flow restrictors. The relief valve further comprises pilot valve means which is operative to connect the compartment with the inlet of the body when the main system pressure rises to a predetermined value whereby the fluid in the compartment causes the valve member to move toward its open position against the opposition of fluid in the pressure chamber and damping chamber. The pressure of fluid in the pressure chamber decreases when the pilot valve means opens and the pressure in the damping chamber increases when the valve member leaves its sealing position. A spring is preferably provided in the pressure chamber to bias the valve member toward sealing position, and the diameter of the piston preferably exceeds the effective diameter of the seat in the body of the main valve. The pilot valve means is preferably adjustable so that the operation can select that main system pressure at which the fluid can enter the compartment to effect movement of the valve member toward open position.

Closing of the valve member takes place automatically when the fluid pressure in the inlet drops below the predetermined value; the pilot valve means then closes and the fluid can leave the compartment by way of the aforementioned passage or passages whereby the fluid in the pressure chamber returns the valve member to sealing position. Such return movement is braked by fluid which acts against an external surface of the valve member and is maintained at the pressure of fluid in the inlet.

The novel features which are considered as characteristic of the invention are set forth in particular in the appended claims. The improved relief valve itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
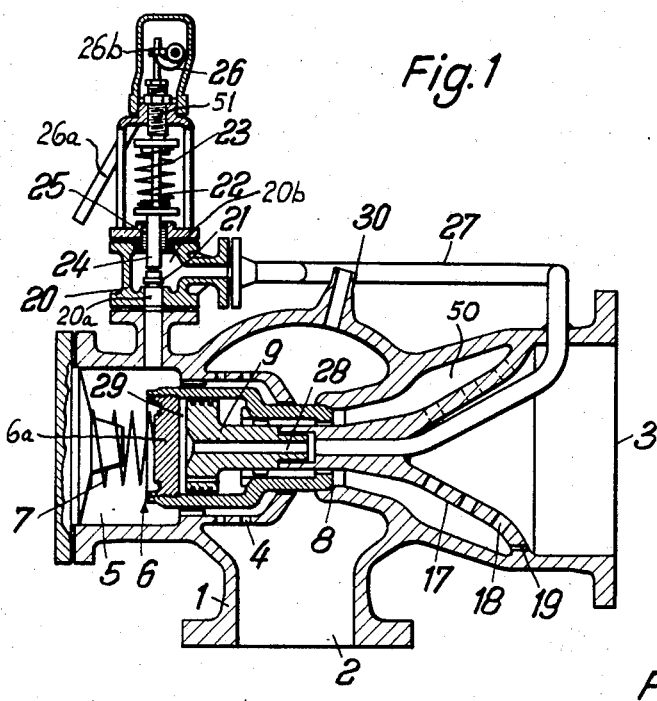
FIG. 1 is a longitudinal sectional view of a pilot-controlled relief valve which embodies the invention, the valve member of the main valve being shown in sealing position.

The pilot-controlled relief valve of FIG. 1 (also called compound relief valve) comprises a main valve having a valve body 1 which is provided with an inlet 2 and an outlet 3. The fluid in the inlet 2 is maintained under main system pressure, and this inlet is normally sealed from the outlet 3 by a hollow valve member 6 which constitutes a multistage cylinder. An internal wall of the valve body 1 is provided with apertures or bores 4 which admit fluid under main system pressure into a pressure chamber 5 of the body 1. This pressure chamber is adjacent to the end wall 6a of the valve member 6. Thus, fluid in the chamber 5 acts to move the valve member 6 in a direction to the right and into engagement with a ring-shaped seat 8 of the main valve. A main valve spring 7 in the pressure chamber 5 assists the fluid in this chamber to urge the valve member 6 against the seat 8; thus, the main valve is invariably closed when the pressure of fluid in the inlet two drops to zero. This is important when the relief valve is being transported, i.e., the valve member 6 then remains in its sealing position.

Figure 2:
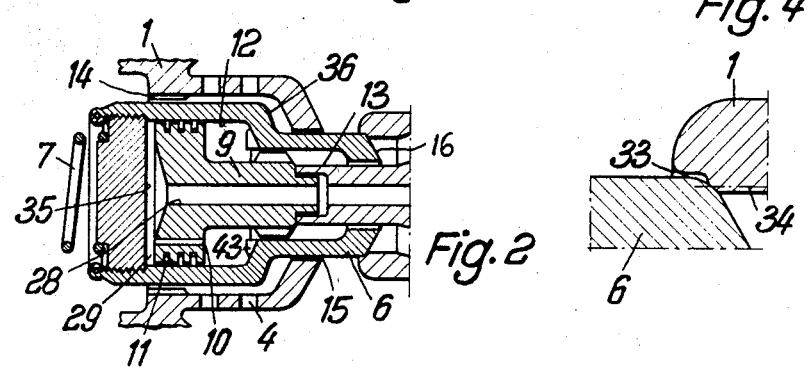
FIG. 2 is an enlarged sectional view of the main valve in sealing position of its valve member.
Figure 3:
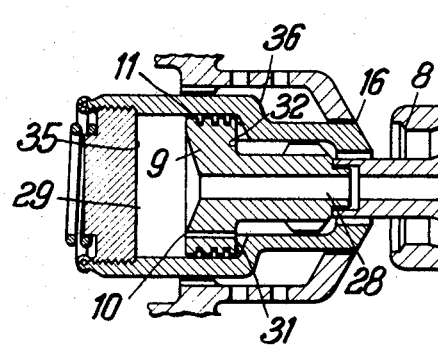
FIG. 3 is a similar enlarged sectional view of the main valve but showing the valve member in open position.

In accordance with a feature of my invention, the cylindrical valve member 6 of the main valve is slidable along a fixedly mounted piston 9 which is provided with an axially parallel passage 10, FIGS. 2 and 3, of relatively small diameter to establish communication between a compartment 29 at the left-hand side of the piston 9 and a damping chamber 12 at the right-hand side of the piston. The compartment 29 is sealed from the pressure chamber 5 and the damping chamber 12 communicates freely with a space 50 located immediately downstream of the seat 8. The head of the piston 9 is provided with several circumferential grooves for piston rings 11 which reduce the leakage of fluid between the compartment 29 and damping chamber 12 to a minimum. The stem of the piston 9 is connected with a tubular portion 13 of the valve body 1, and this tubular portion extends with clearance through the valve seat 8 and is integral with a funnel shaped baffle or flow restrictor 17 having circular or slot-shaped openings 18 through which the fluid can flow from the damping chamber 12 into the outlet 3 or vice versa. The valve member 6 is slidable on the head of the piston 9 and is further guided by internal ribs 14 and by a internal surface surrounding a bore 15 of the body 1. The right-hand end portion of he valve member 6 is provided with a conical sealing face 16 (see particularly FIGS. 2 and 3). The seat 8 has a complementary conical sealing face shown in FIGS. 2 and 3. The deepmost zone of the space 50 communicates with the outlet 3 by way of a horizontal bore 19 serving to evacuate condensate from the space 50.

The housing of a pilot valve 20 is mounted on a flange of the body 1 and the inlet 20a of the pilot valve housing is in communication with the pressure chamber 5 (see FIG. 1). The valve member 21 of the pilot valve 20 is preferably of conical shape and is biased against the seat at the upper end of the inlet 20a by a helical spring 23 whose bias can be adjusted to select in advance that fluid pressure at which the pilot valve opens to permit fluid to flow from the pressure chamber 5 into the compartment 29 by way of a conduit 27 and an axial bore 28 of the piston 9. The stem 22 of the pilot valve 20 carries the valve member 21 and the lower one of two retainers for the spring 23; the upper retainer is adjustable by a screw 51 to thereby change the bias of the spring 23. The stem 22 has an enlarged portion 24 whose diameter corresponds to the effective diameter of the seat for the valve member 21. In certain instances, the pilot valve 20 may comprise a bellows (not shown) which is installed above the passage 25 for the valve stem 22 to completely seal the surrounding atmosphere from the chamber 20b for the valve member 21. The pilot valve 20 further comprises a customary manually operated valve opening device including a lever 26a which can turn a cam 26 engaging an adjustable follower nut 26b on the stem 22. When the lever 26a is turned in a clockwise direction, the cam 26 lifts the stem 22 to thereby move the valve member 21 away from the seat at the upper end of the inlet 20a.

The body 1 is further provided with a small nipple 30 which communicates with the inlet 2 and can be connected to a fluid circulating conduit, not shown.

THE OPERATION

When the main system fluid pressure in the inlet 2 and pressure chamber 5 rises to a predetermined value, the fluid lifts the valve member 21 of the pilot valve 20 off its seat whereby the fluid flows from the chamber 20b, through the conduit 27 and bore 28 of the piston 9 and enters the compartment 29 where it acts against the inner end face 35 of the end wall 6a of the valve member 6 and tends to move the valve member away from the seat 8 to thereby stress the spring 7. The opening action of fluid which exerts pressure against the end face 35 is assisted by the pressure of fluid which acts against the external annular surface 36 of the valve member 6; this annular surface is located to the left of the bore 15 and is acted upon by fluid at full system pressure because such fluid can reach the annular surface through the apertures 4. The valve member 6 moves away from the sealing position shown in FIGS. 1 and 2 and ultimately assumes the fully open position of FIG. 3 in which its stops or projections 31 engage the right-hand end face 32 of the fixed piston 9 to thereby arrest the valve member 6 in such fully open position.

While the valve member 6 moves from the sealing position of FIG. 2 to the open position of FIG. 3, the pressure in the space 50 upstream of the baffle 17 rises because the openings 18 throttle the flow of fluid into the outlet 3 whereby the pressure in the damping chamber 12 also rises and such fluid acts against an internal annular surface 43 (FIG. 2) of the valve member to brake the movement of this valve member toward the fully open position of FIG. 3. Thus, the damping chamber 12 can receive fluid which produces a damping or braking action to prevent rapid movement of the valve member 6 toward its open position and to thereby avoid strong impact of stops 31 against the end face 32 of the piston 9.

When the pressure of fluid in the inlet 2 drops below the predetermined maximum value, the spring 23 of the pilot valve 20 returns the valve member 21 to sealing position so that the compartment 29 is sealed from the pressure chamber 5 and inlet 2. This brings about gradual closing of the valve member 6 in the following way: The pressure fluid in the chamber 5 is assisted by the spring 7 to urge the valve member 6 toward the seat 8 whereby the fluid which fills the compartment 29 escapes by way of the passage 10 in the piston 9 and enters the dampening chamber 12 (the passage 10 can be replaced by an adjustable flow restrictor, not shown). The pressure of fluid in the space 50 (and hence in the chamber 12) decreases gradually whereby the pressure of fluid against the internal surface 43 also decreases to ensure that the valve member 6 is not unduly accelerated during movement toward sealing position. It will be noted that fluid in the chamber 12 can produce a desirable braking action when the valve member 6 leaves the sealing position of FIG. 1 or 2 and that such fluid exerts a gradually diminishing pressure (surface 43) when the valve member 6 leaves its fully open position of FIG. 3. It was found that the damping action of fluid in the chamber 12 is most effective shortly before the valve member 6 reaches its sealing position. This is due to the fact that, when the valve member 6 approaches its fully open position, the pressure of fluid in the damping chamber 12 rises to a maximum value and approaches the fluid pressure in the inlet 2; such pressure is effective to bring about a desirable braking action in response to fluid pressure against the internal surface 43 of the valve member 6.

When the valve member 6 almost reaches the sealing position of FIG. 1 or 2, the pressure in the chamber 12 decreases to a minimum value. This is important because the valve member 6 can begin its movement from fully open position or sealing position without any delay, i.e., in immediate response to that pressure which is selected by the bias of the spring 3 in the pilot valve 20. The fluid in the chamber 12 merely ensures that the valve member 6 cannot be propelled with excessive force against the piston 9 (in fully open position) and the absence of pressure in the chamber 12 ensures that the valve member cannot strike against the seat 8 during the last stage of movement toward sealing position. Some braking action is produced by fluid which acts against the sealing face 16 during movement of the valve member 6 toward sealing position as well as by fluid which acts against the external surface 36. Additional braking action is produced by fluid which is forced to flow through the passage 10.

An important function of the baffle 17 is to bring about a rise in the pressure of fluid in the space 50 when the valve member 6 moves away from its sealing position. Such pressure rise is communicated to fluid in the damping chamber 12 whereby the fluid acts against the internal surface 43 to oppose excessive acceleration of the valve member 6. As stated before, the damping chamber 12 is also beneficial during movement of the valve member 6 toward the sealing position of FIG. 1 or 2 because the pressure of fluid in the space 50 and in the damping chamber 12 is caused to decrease during closing of the main valve so that the pressure against the internal surface 43 also decreases and the fluid in the chamber 12 is less prone to effect excessive acceleration of the valve member 6 during movement toward its sealing position This ensures that the sealing face 16 and the complementary face of the seat 8 are not subjected to excessive wear.

Figure 4:
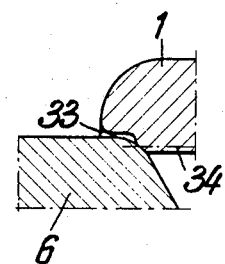
FIG. 4 is an enlarged fragmentary sectional view of the valve member and the valve seat of the main valve, showing the valve member in sealing position.
Figure 5:
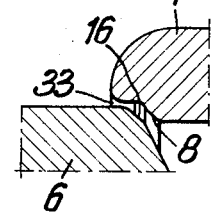
FIG. 5 is a similar fragmentary sectional view but showing the valve member in partly open position.

The stability of the relief valve during evacuation of fluid in response to excessive pressure in the inlet 2 can be enhanced still further if the body 1 is provided with an annular recess 33 which is located immediately upstream of the seat 8 (see FIGS. 4 and 5) and receives the adjacent front end portion of the valve member 6 with some clearance to form therewith an annular gap shown in FIG. 4. This gap causes a pressure drop between the end face 16 of the valve member 6 and the complementary conical face of the seat 8 when the valve member moves away from its sealing position. Such pressure drop causes a temporary decrease of the valve opening force while the valve member 6 leaves the sealing position. The aforementioned annular gap along the recess 33 of the body 1 is also effective when the valve member 6 returns toward the sealing position the drop of pressure between the end face 16 and the complementary face of the seat 8 then enables the valve member 6 to rapidly complete the last stage of its movement toward the sealing position of FIG. 1, 2 or 4 and to be properly centered with reference to the seat 8. This is particularly important when the relief valve is mounted in a horizontal position as shown in FIG. 1. The diameter of the head of the piston 9 exceeds the effective (average) diameter 34 (FIG. 4) of the seat 8.

The recess 33 of the body 1 prevents too rapid outflow of fluid via seat 8 during the initial stage of movement of the valve member 6 toward open position. This recess further ensures that the valve member 6 is subjected to an additional braking action because a portion of the opening force is destroyed when the sealing face 16 moves away from the seat 8. This is due to the fact that the pressure against that portion of sealing face 16 which is located outwardly of the effective diameter 34 drops as soon as the valve member 6 begins to move toward the open position and while the front end portion of the valve member 6 remains within the confines of the recess 33. The loss in opening force is compensated during further opening of the valve member; however, the pressure of fluid in the damping chamber 12 is then already high enough to offer satisfactory resistance to excessive acceleration of the valve member 6 during further movement toward the fully open position.

The purpose of the conical sealing face 16 (and of the complementary conical face on the seat 8) is to facilitate the movement of the valve member to its sealing position regardless of the position of the relief valve during such movement. Thus, the valve member 6 readily finds its way into sealing engagement with the seat 8 irrespective of whether the axis of the piston 9 is vertical, horizontal or otherwise inclined. Such movement of the valve member 6 toward sealing position is further enhanced by the fact that the sealing force increases when the front end portion of the valve member 6 enters the recess 33 of the body 1. However, such increase in sealing force does not cause an excessive impact of the sealing face 16 against the body 1.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

I claim:

1. In a relief valve, particularly for use in connection with steam and other gaseous fluids, a combination comprising a main valve including a body having an inlet for fluid under main system pressure, an outlet and a seat between said inlet and said outlet, a cylindrical valve member defining with said body a pressure chamber in communication with said inlet, and a piston slidably guiding said valve member for movement between a sealing position of engagement with said seat and an open position, said valve member defining with said piston a damping chamber in communication with said outlet and a compartment sealed from said pressure chamber; and pilot valve means operative to connects said compartment with said inlet when the main system pressure rises to a predetermined value whereby the fluid in said compartment causes the valve member to move toward open position against the opposition of fluid in said chambers.

2. A combination as defined in claim 1, further comprising means for permanently biasing said valve member to sealing position, said piston being fixedly mounted in said body.

3. A combination as defined in claim 2, wherein the diameter of said piston exceeds the effective diameter of said seat.

4. A combination as defined in claim 3, wherein said valve member comprises an end wall separating said compartment from said pressure chamber and wherein said body defines a space located immediately downstream of said seat and communicating with said damping chamber, and further comprising baffle means for throttling the flow of fluid between said space and said outlet.

5. A combination as defined in claim 1, wherein said body is provided in an annular recess located immediately upstream of said seat and receiving with clearance that portion of said valve member which engages the seat in sealing position of the valve member.

6. A combination as defined in claim 1, wherein said valve member comprises a conical sealing face which engages a complementary conical face of said seat in the sealing position of said valve member.

7. A combination as defined in claim 1, wherein said valve member comprises an external annular surface which is subjected to the pressure of fluid in said inlet whereby such fluid tends to move said valve member away from sealing position.

8. A combination as defined in claim 1, wherein said piston is provided with a passage permitting limited communication between said compartment and said damping chamber.

9. A combination as defined in claim 1, wherein said valve member is provided with an internal annular surface located in said damping chamber, the fluid which enters said damping chamber on movement of said valve member away from sealing position acting against such internal surface to oppose the movement of said valve member toward open position.

10. A combination as defined in claim 1, wherein said pilot valve means is adjustable to determine that fluid pressure in said inlet at which the pilot valve means permits fluid to flow from said inlet into said compartment.